(12) United States Patent
Park et al.

(10) Patent No.: US 9,402,215 B1
(45) Date of Patent: Jul. 26, 2016

(54) RESOURCE BLOCK ALLOCATION TO AVOID INTERFERENCE

(71) Applicant: Sprint Spectrum LP, Overland Park, KS (US)

(72) Inventors: Sungki Park, Ashburn, VA (US); Saied Kazeminejad, Ashburn, VA (US); Senthil K. Veeraragavan, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 180 days.

(21) Appl. No.: 14/023,733

(22) Filed: Sep. 11, 2013

(51) Int. Cl.
*H04W 72/00* (2009.01)
*H04W 36/06* (2009.01)

(52) U.S. Cl.
CPC ...................... *H04W 36/06* (2013.01)

(58) Field of Classification Search
CPC ..... H04W 92/02; H04W 16/32; H04W 24/02; H04W 16/02; H04W 16/14; H04W 16/00; H04W 72/04; H04W 16/10
USPC .............. 455/443, 444, 447–450, 452.1, 452; 370/310, 322, 329, 348, 431, 433, 437, 370/443
See application file for complete search history.

(56) References Cited

U.S. PATENT DOCUMENTS

| | | | |
|---|---|---|---|
| 2010/0118827 A1* | 5/2010 | Sundaresan et al. | 370/330 |
| 2010/0285795 A1 | 11/2010 | Whinnett | |
| 2011/0183678 A1 | 7/2011 | Kerpez et al. | |
| 2011/0223923 A1* | 9/2011 | Cho et al. | 455/448 |
| 2012/0064904 A1* | 3/2012 | Lee et al. | 455/450 |
| 2012/0157108 A1* | 6/2012 | Boudreau et al. | 455/450 |
| 2013/0029710 A1* | 1/2013 | Nakamura | 455/509 |

* cited by examiner

*Primary Examiner* — Kamran Afshar
*Assistant Examiner* — Ather Mohiuddin

(57) ABSTRACT

A first indicator of a first distance between an access node and a first sub-cell access node is determined. The first sub-cell access node is located in a coverage area of the access node. Based on the first indicator of the first distance, a first allocation of air-interface resource blocks to be used by both the access node and the first sub-cell access node is selected.

14 Claims, 6 Drawing Sheets

RESOURCE BLOCK ALLOCATION TO AVOID INTERFERENCE

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

In order to provide for better wireless network coverage in certain environments (e.g., indoors, or congested areas such as stadiums and arenas), smaller, lower power network access nodes (a.k.a., sub-cells) may be deployed within the coverage area of a higher power access node (a.k.a., macrocell). These sub-cell access nodes may be referred to as, for example, femtocell base stations (femtocells), picocell base stations (picocells), Home evolved Node Bs (HeNBs), and/or Enterprise evolved Node Bs (EeNBs). Since sub-cell access nodes use the same air interface frequencies as the macrocell, and are located within the coverage area of one or more macrocells, sub-cell access node transmissions can cause interference with communication between wireless devices and the macrocell.

Overview

In an embodiment, a method of operating a communication system includes determining a first indicator of a first distance between an access node and a first sub-cell access node. The first sub-cell access node is located in a coverage area of the access node. Based on the first indicator of the first distance, a first allocation of air-interface resource blocks to be used by both the access node and the first sub-cell access node is selected.

In an embodiment, an access node has an access node scheduler. A sub-cell access node is located in the coverage area of the access node. The sub-cell access node is located a first distance from the access node. The sub-cell access node has a sub-cell scheduler. A management node is in communication with the access node scheduler and the sub-cell scheduler. The management node determines an allocation of air-interface resource blocks to be used by both the access node scheduler and the first sub-cell scheduler. This allocation is based on the first distance.

In an embodiment, an access node is configured to use a first allocation of resource blocks. A sub-cell access node is configured to use a second allocation of resource blocks. The first allocation and the second allocation have an overlapping number of resource blocks to be used by both the access node and the sub-cell access node. The overlapping number of resource blocks is dependent on the distance from the sub-cell access node to the access node.

DETAILED DESCRIPTION

In an embodiment, a macrocell has one or more sub-cell access nodes operating within its coverage area. When the macrocell or the sub-cells are highly loaded, the same resource blocks may be allocated to be used by both the macrocell and a sub-cell. Because the same resource blocks are allocated to be used by both the macrocell and a sub-cell, interference can occur between the macrocell and the sub-cell on these overlapping resource blocks.

To reduce this interference, the allocation of resource blocks to the sub-cell is based on the distance from the sub-cell to the macrocell. For example, because uplink transmissions from wireless devices served by sub-cells that are closer to the macrocell interfere more with transmissions received by the macrocell than those wireless devices being served by far away sub-cells, the close-in sub-cells can be given uplink allocations with fewer (or none) resource blocks that are also being used by the macrocell. In another example, because a far away sub-cell may be closer to a wireless device being served by the macrocell than the macrocell (thus interfering with the downlink communication from the macrocell to the wireless device), the far away sub-cell may be given downlink allocations with fewer (or none) resource blocks that overlap with resource blocks that are also being used by the macrocell.

Figure 1:
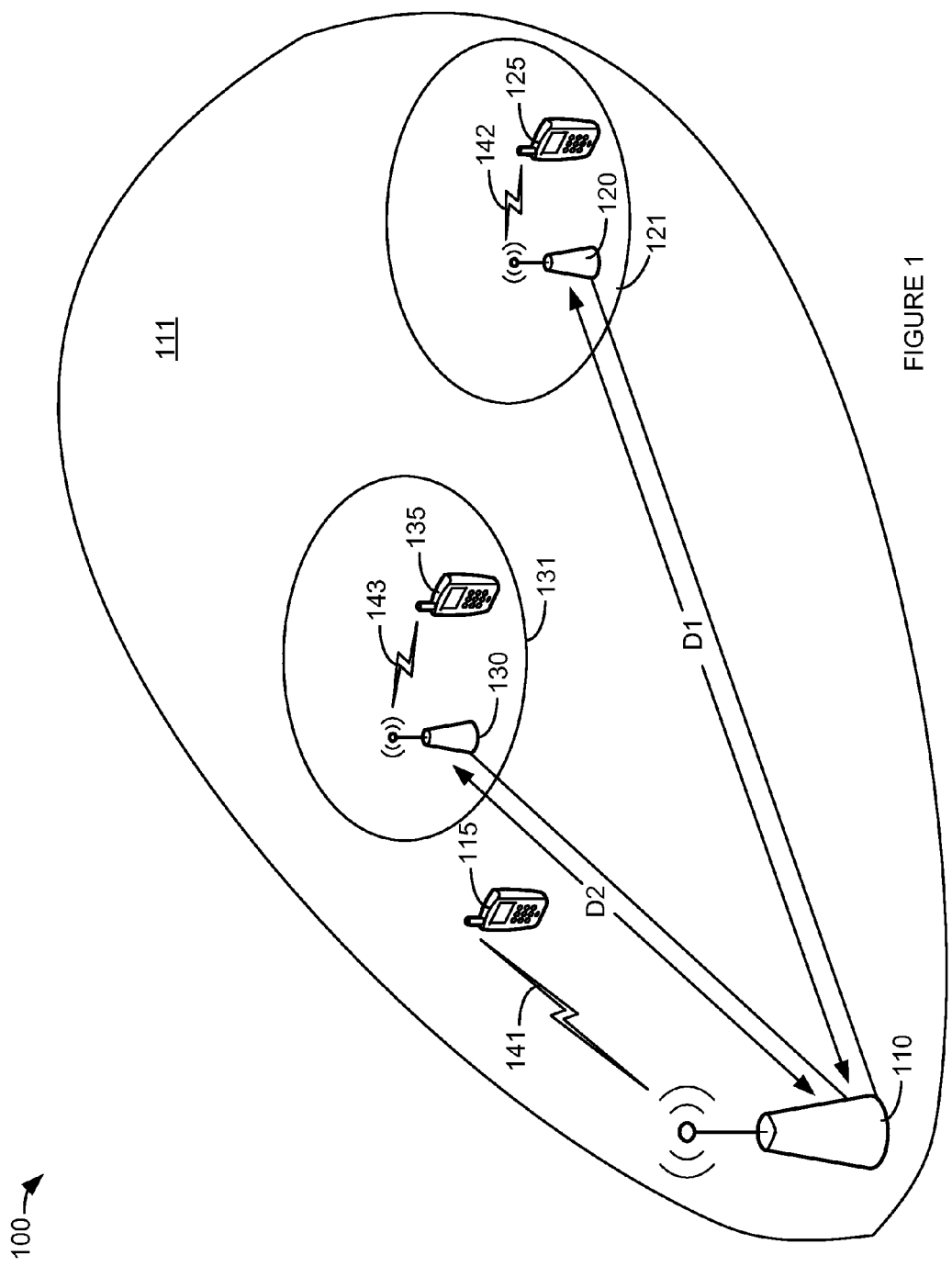
FIG. 1 is a block diagram illustrating a communication system.

FIG. 1 is a block diagram illustrating a communication system. In FIG. 1, communication system 100 comprises access node 110, sub-cell access node 120, sub-cell access node 130, wireless device 115, wireless device 125, and wireless device 135. Access node 110 is illustrated as having coverage area 111. Sub-cell access node 120 is illustrated as having coverage area 121. Sub-cell access node 130 is illustrated as having coverage area 131. Coverage area 121 is illustrated as being within coverage area 111. Coverage area 131 is illustrated as being within coverage area 111.

Sub-cell access node 120 is operatively coupled to access node 110. Sub-cell access node 120 is illustrated as being at a distance D1 from access node 110. Sub-cell access node 130 is operatively coupled to access node 130. Sub-cell access node 130 is illustrated as being at a distance D2 from access node 110.

Wireless device 115 is located within coverage area 111. Wireless device 125 is located within coverage area 121. Wireless device 135 is located within coverage area 131. Wireless device 115 is operatively coupled to access node 110 by wireless link 141. Wireless device 125 is operatively coupled to sub-cell access node 120 by wireless link 142. Wireless device 135 is operatively coupled to sub-cell access node 130 by wireless link 143. Thus, it should be understood that wireless device 115 is being served by access node 110 (via wireless link 141); wireless device 125 is being served by sub-cell access node 120 (via wireless link 142); and, wireless device 135 is being served by sub-cell access node 130 (via wireless link 143).

Access node 110 is a network node capable of providing wireless communication to wireless device 115, wireless device 125, and/or wireless device 135. Access node 110 can be, for example, one or more of a base transceiver station, a radio base station, an eNodeB device, or an enhanced eNodeB device. Access node 110 communicates with wireless device 115 via wireless link 141.

Sub-cell access node 120 is a network node capable of providing wireless communication to wireless device 115, wireless device 125, and/or wireless device 135 within a limited coverage area 121 within coverage area 111. Sub-cell access node 120 can be, for example, one or more of a femtocell base stations (femtocell), picocell base station (picocell), Home evolved Node B (HeNB), and/or Enterprise evolved Node B (EeNB). Sub-cell access node 120 uses the same air interface as access node 110. Sub-cell access node 120 communicates with wireless device 125 via wireless link 142.

Sub-cell access node 130 is a network node capable of providing wireless communication to wireless device 115, wireless device 125, and/or wireless device 135 within a limited coverage area 131 within coverage area 111. Sub-cell access node 130 can be, for example, one or more of a femtocell, picocell, HeNB, and/or EeNB. Sub-cell access node 130 uses the same air interface as access node 110 (and therefore sub-cell access node 120, as well). Sub-cell access node 130 communicates with wireless device 135 via wireless link 143.

Communication system 100 is a communication network that can provide wireless communication to wireless device 115, wireless device 125, and/or wireless device 135. Communication system 100 comprises a communication network that can provide communication between access node 110 and sub-cell access node 120. Communication system 100 comprises a communication network that can provide communication between access node 110 and sub-cell access node 130. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 141, wireless link 142 and/or wireless link 143 can be a radio frequency, microwave, infrared, or other similar signal. Wireless link 141, wireless link 142 and/or wireless link 143 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

In LTE specified technology, for a 5 MHz system, there are 25 resource blocks (RBs) in each 1 ms subframe (a.k.a. physical resource blocks—PRBs). Each subframe has 168 resource elements (REs). A resource element is the minimum allocation in the frequency and in the time domain.

Resource elements are allocations of frequency and time that access node 110, sub-cell access node 120, and sub-cell access node 130 utilize to communicate with wireless devices. For example, in an LTE specified system, transmissions are divided into subframes. Subframes are allocations of transmission times. Each subframe is further divided into allocations of frequency and symbols. Symbols are an allocation of time that is less than a subframe. A minimum unit of frequency and time that may be allocated in a subframe (or resource block) of an LTE specified system may be referred to as a slot (84 REs in a 5 MHz system). Two 0.5 ms slots (i.e., resource blocks) comprise a 1 ms subframe. The term "slot" may be applied to other wireless systems. In particular the term "slot" (meaning an allocation of frequency and time) may be used to describe the sub-channels of other systems that utilize orthogonal frequency-division multiple access (OFDMA).

Other network elements may be present in communication system 100 to facilitate wireless communication to/from access node 110, sub-cell access node 120, sub-cell access node 130, wireless device 115, wireless device 125, and/or wireless device 135 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 115, wireless device 125, and/or wireless device 135 may be any device, system, combination of devices, or other such communication platform capable of communicating wirelessly with access node 110, sub-cell access node 120, and sub-cell access node 130. Wireless device 115, wireless device 125, and/or wireless device 135 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110, sub-cell access node 120, and sub-cell access node 130. Other types of communication platforms are possible.

Communication system 100 allocates resource blocks to be used by access node 110, sub-cell access node 120, and sub-cell access node 130. Communication system 100 allocates resource blocks to be used by sub-cell access node 120 based on the distance, D1, from access node 110 to sub-cell access node 120. Likewise, Communication system 100 may allocate resource blocks to be used by sub-cell access node 130 based on the distance, D2, from access node 110 to sub-cell access node 130.

For example, when access node 110 is highly loaded, the same resource blocks may be allocated to be used by both access node 110 and a sub-cell access node 120 (a.k.a., overlapping resource blocks). In other words, the same resource blocks may be allocated to access node 110 to communicate with wireless device 115 and also allocated to sub-cell access node 120 to communicate with wireless device 125. Likewise, the same resource blocks may be allocated to access node 110 to communicate with wireless device 115 and also allocated to sub-cell access node 130 to communicate with wireless device 135. Because the same resource blocks are allocated to be used by both access node 110 and sub-cell access node 120, interference can occur on these overlapping resource blocks. Likewise, because the same resource blocks are allocated to be used by both access node 110 and sub-cell access node 130, interference can occur on these overlapping resource blocks as well.

To reduce interference, communication system 100 bases the allocation of resource blocks to sub-cell access node 120 on the distance from sub-cell access node 120 to the access node 110. Communication system 100 may also base the allocation of resource blocks to sub-cell access node 130 on the distance from sub-cell access node 130 to the access node 110 and the distance from sub-cell access node 120 to the access node 110.

Figure 2:
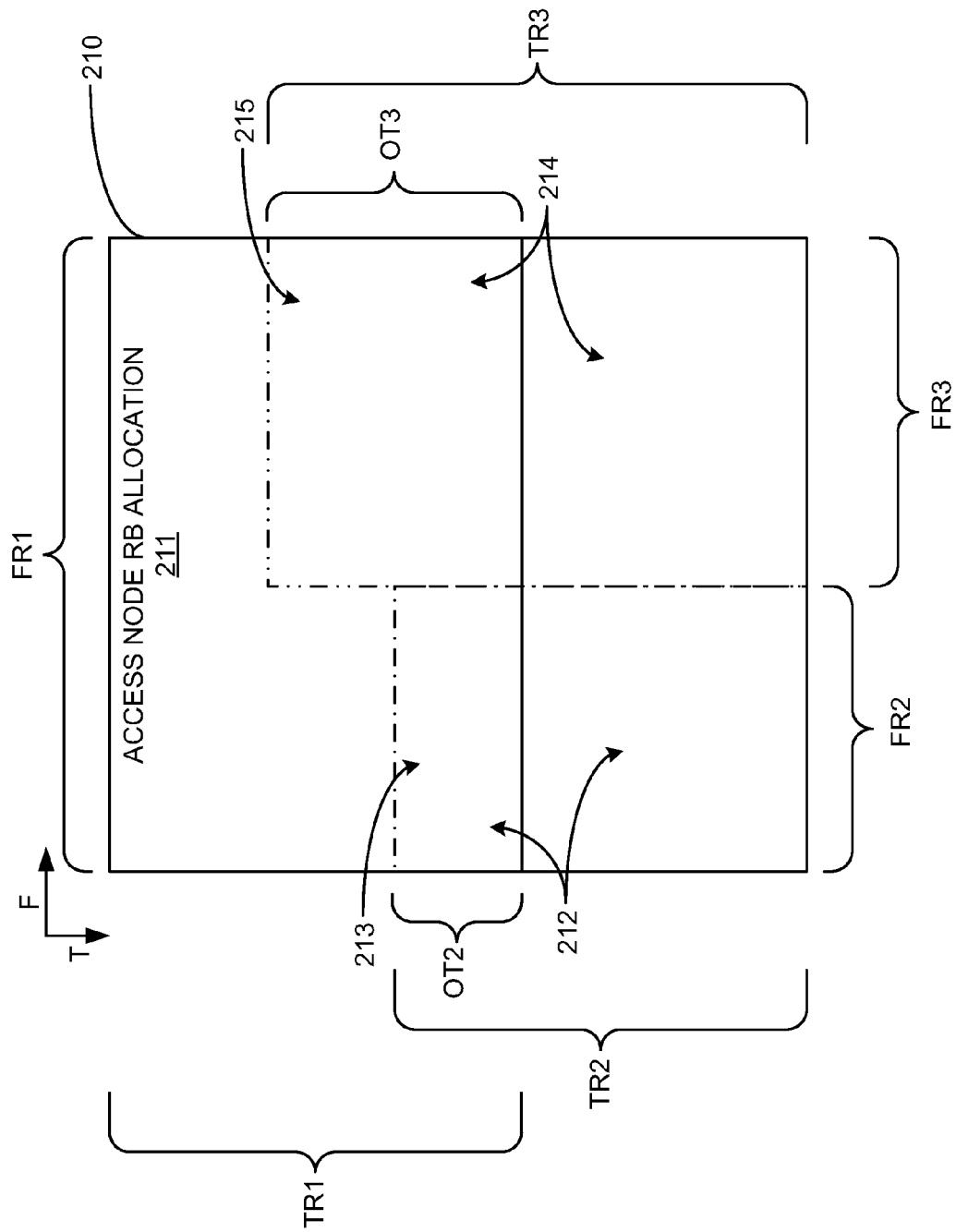
FIG. 2 is an illustration of overlapping resource block allocations.

For example, if sub-cell access node 130 is closer to access node 110 than sub-cell access node 120 (i.e., D1>D2), then sub-cell access node 130 can be given uplink resource block allocations that have fewer overlapping resource blocks that are also being used by the access node 110. In another example, if sub-cell access node 120 is farther from access node 110 than sub-cell access node 130 (i.e., D1>D2), then sub-cell access node 120 can be given downlink resource block allocations that have fewer overlapping resource blocks that are also being used by the access node 110. FIG. 2 helps illustrate.

FIG. 2 is an illustration of overlapping resource block allocations. In FIG. 2, frequency allocations are shown in the horizontal direction and time allocations are shown in the vertical direction. The entire range of time-frequency allocations (e.g., resource blocks) is shown as the rectangle (e.g., frame or sub-frame) 210. An access node (e.g., access node 110) is allocated the resource blocks in the allocation 211. Allocation 211 consists of the resource blocks occupying the time range TR1 and the frequency range FR1. A first sub-cell access node (e.g., sub-cell access node 120) is allocated the resource blocks in allocation 212. Allocation 212 consists of the resource blocks occupying the time range TR2 and the frequency range FR2. A second sub-cell access node (e.g., sub-cell access node 130) is allocated the resource blocks in allocation 214. Allocation 214 consists of the resource blocks occupying the time range TR3 and the frequency range FR3.

As can been seen from FIG. 2, allocation 212 overlaps allocation 211 for the frequency range FR2 and the time range OT2. These overlapping resource blocks are illustrated in FIG. 2 by overlapping allocation 213. Allocation 214 overlaps allocation 211 for the frequency range FR3 and the time range OT3. These overlapping resource blocks are illustrated in FIG. 2 by overlapping allocation 215.

In an embodiment, communication system 100 would select the number of resource blocks in overlapping allocation 213 and overlapping allocation 215 based on the distance the respective sub-cell access node is from access node 110. In other words, if sub-cell access node 120 was given allocation 212, and access node 130 was given allocation 214, then the relative size of overlapping allocation 213 and overlapping allocation 214 would be based on distances D1 and D2.

For example, if D1>D2, communication system 100 can select TR2 and FR2, and TR3 and FR3, in relation to allocation 211 such that the number of resource blocks in overlapping allocation 213 is smaller than the number of resource blocks in overlapping allocation 215. In another example, if D1>D2, communication system 100 can select TR2 and FR2, and TR3 and FR3, in relation to allocation 211 such that the number of resource blocks in overlapping allocation 213 is greater than the number of resource blocks in overlapping allocation 215. Whether the number of resource blocks in overlapping allocation 213 is greater than the number of resource blocks in overlapping allocation 215 may depend upon whether the allocation is for uplink or downlink communication between to/from wireless device 115, wireless device 125, and wireless device 135.

Figure 3:
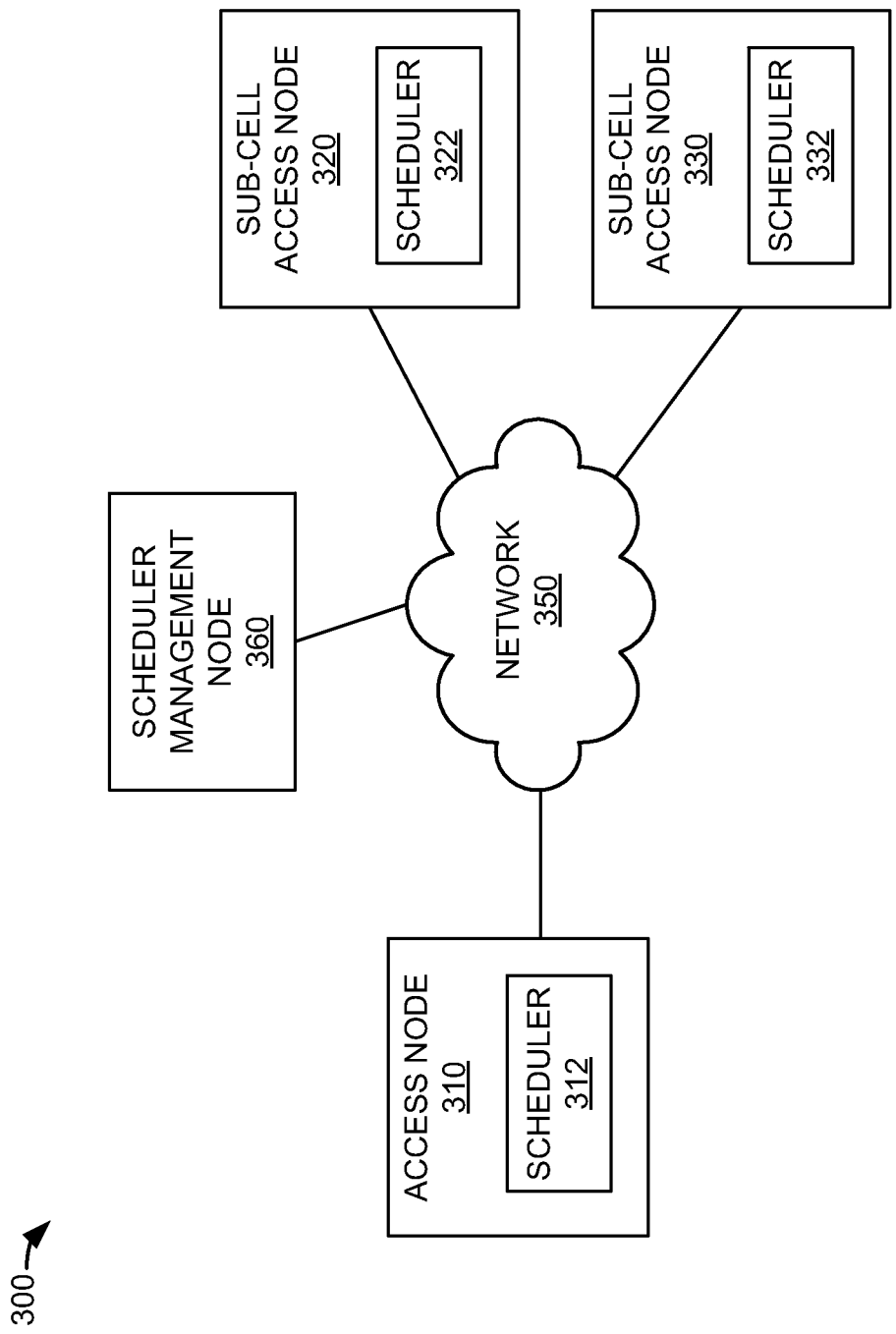
FIG. 3 is a block diagram illustrating a communication system.

FIG. 3 is a block diagram illustrating a communication system. In FIG. 3, communication system 300 comprises access node 310, sub-cell access node 320, sub-cell access node 330, network 350, and scheduler management node 360.

Access node 310 is operatively coupled to network 350. Sub-cell access node 320 is operatively coupled to network 350. Sub-cell access node 330 is operatively coupled to network 350. Scheduler management node 360 is operatively coupled to network 350. Thus, scheduler management node 360 can be operatively coupled via network 350 to access node 310, sub-cell access node 320, and sub-cell access node 330. Scheduler management node 360 can also be operatively coupled via network 350 to scheduler 312, scheduler 322, and scheduler 332.

Access node 310 is a network node capable of providing wireless communication to wireless devices (not shown in FIG. 3). Access node 110 can be, for example, one or more of a base transceiver station, a radio base station, an eNodeB device, or an enhanced eNodeB device.

Sub-cell access node 320 is a network node capable of providing wireless communication to wireless devices (not shown in FIG. 3) within a limited coverage area that is within the coverage area of access node 310. Sub-cell access node 320 is a first distance from access node 310. Sub-cell access node 320 can be, for example, one or more of femtocell, picocell, HeNB, and/or EeNB. Sub-cell access node 320 uses the same air interface as access node 310.

Sub-cell access node 330 is a network node capable of providing wireless communication to wireless devices (not shown in FIG. 3) within a limited coverage area that is within the coverage area of access node 310. Sub-cell access node 330 is a second distance from access node 310. This second distance may be different than the first distance that sub-cell access node 320 is from access node 310. Sub-cell access node 330 can be, for example, one or more of femtocell, picocell, HeNB, and/or EeNB. Sub-cell access node 330 uses the same air interface as access node 310.

Communication system 300 is a communication network that can provide wireless communication to wireless devices. Communication system 300, and network 350 in particular, can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 300 and network 350 can also comprise wireless networks, including base station, wireless communication nodes, telephony switches, internet routers, network gateways, computer systems, communication links, or some other type of communication equipment, and combinations thereof.

Wired network protocols that may be utilized by communication system 300 and/or network 350 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 300 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 300, can be, for example, twisted pair cable, coaxial cable or fiber optic cable, or combinations thereof. Communication from/to access node 310, sub-cell access node 320, and sub-cell access node 330 and wireless devices can use a radio frequency, microwave, infrared, or other similar signal. Communication from/to access node 310, sub-cell access node 320, and sub-cell access node 330 and wireless devices can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication to/from access node 310, sub-cell access node 320, sub-cell access node 330 and wireless devices but are omitted for clarity, such as base stations, base station controllers, gateways, mobile switching centers, dispatch application processors, and location registers such as a home location register or visitor location register. Furthermore, other network elements may be present to facilitate communication between among elements of communication system 300 which are omitted for clarity, including additional processing nodes, routers, gateways, and physical and/or wireless data links for carrying data among the various network elements.

Scheduler management node 360 allocates resource blocks to be used by access node 310, sub-cell access node 320, and sub-cell access node 330. In particular, scheduler management node 360 allocates resource blocks that can be used by scheduler 312, scheduler 322, and scheduler 332. Scheduler management node 360 configures access node 310, sub-cell access node 320, and sub-cell access node 330 (and scheduler 312, scheduler 322, and scheduler 332, in particular) to use the resource allocations made by scheduler management node 360.

In an embodiment, scheduler management node 360 allocates resource blocks to be used by sub-cell access node 320 based on the distance between access node 310 and sub-cell access node 320. Likewise, scheduler management node 360 allocates resource blocks to be used by sub-cell access node 330 based on the distance between access node 310 and sub-cell access node 330.

For example, when communication system 300 is highly loaded, scheduler management node 360 may configure access node 310 and a sub-cell access node 320 to use at least some of the same resource blocks. Likewise, scheduler management node 360 may configure access node 310 and a sub-cell access node 330 to use at least some of the same resource blocks. Because some resource blocks are allocated to be used by both access node 310 and sub-cell access node 320, interference can occur on these overlapping resource blocks. Likewise, because some resource blocks are allocated to be used by both access node 310 and sub-cell access node 330, interference can occur on these overlapping resource blocks as well.

To reduce interference, scheduler management node 360 bases the allocation of resource blocks to sub-cell access node 320 on the distance from sub-cell access node 320 to access node 310. Scheduler management node 360 may also base the allocation of resource blocks to sub-cell access node 330 on the distance from sub-cell access node 330 to access node 310 and the distance from sub-cell access node 320 to access node 310. Scheduler management node 360 may also base the allocation of overlapping resource block based on key performance indicators associated with access node 310, sub-cell access node 320, and/or sub-cell access node 330. Key performance indicators that scheduler management node 360 uses to base the allocation of overlapping resource blocks can include, for example, packet error rate, packet drop rate, CINR, and/or RSSI. Other performance indicators may be used as all or part of the basis for allocation overlapping resource blocks as well.

Scheduler management node 360 may determine a first allocation of resource blocks such that a first number of air-interface resource blocks are used by both access node 310 and sub-cell access node 320. Scheduler management node 360 may determine the first allocation such that the first number of air-interface resource blocks used by both access node 310 and sub-cell access node 320 increases as the distance between access node 310 and sub-cell access node 320 increases.

Scheduler management node 360 may determine, based on the first distance between sub-cell access node 320 and access node 310, and the second distance between access node 330 and access node 310, a second allocation of air-interface resource blocks to be used by scheduler 312, scheduler 322, and scheduler 332. Scheduler management node 360 may determine the second allocation such that a second number of air-interface resource blocks are used by both access node 310 and sub-cell access node 330. Scheduler management node 360 may determine the second allocation such that the first number of air-interface resource blocks is greater than the second number of air-interface resource blocks when the first distance is greater than the second distance.

Scheduler management node 360 may, based on the first distance, determine an allocation of air-interface resource blocks to be used by scheduler 322 and not scheduler 312. In other words, if sub-cell access node 320 is close enough (or far enough) from access node 310, scheduler management node 360 may determine an allocation of resource blocks where the resource blocks to be used by sub-cell access node 320 do not overlap the resource blocks to be used by access node 310.

Figure 4:
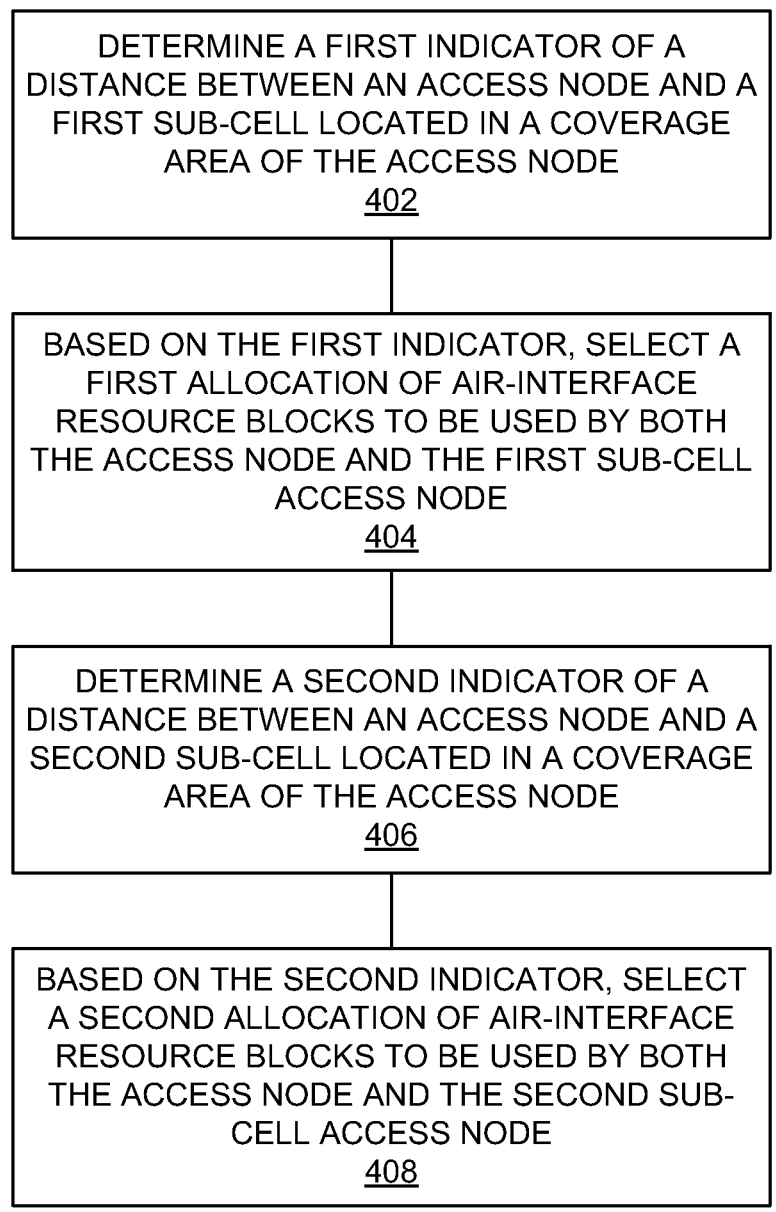
FIG. 4 is a flowchart illustrating a method of operating a communication system.

FIG. 4 is a flowchart illustrating a method of operating a communication system. The steps illustrated in FIG. 4 may be performed by one or more elements of communication system 100 and/or communication system 300. A first indicator of a distance between an access node and a first sub-cell located in a coverage area of the access node is determined (402). For example, communication system 100 may determine that sub-cell 120 is distance D1 from access node 110. Global positioning system (GPS) indicators, signals strength indicators, signal time, or other methods may be used to determine the distance between sub-cell 120 and access node 110. Based on the first indicator, a first allocation of air-interface resource blocks to be used by both the access node and the first sub-cell access node is selected (404). For example, based on the distance D1, communication system 100 may select a first allocation of overlapping resource blocks to be used by both access node 110 and sub-cell access node 120. The first allocation of overlapping resource blocks may increase or decrease as the first distance increases.

A second indicator of a distance between an access node and a second sub-cell located in a coverage area of the access node is determined (406). For example, communication system 100 may determine that sub-cell 130 is distance D2 from access node 110. Based on the second indicator, a second allocation of air-interface resource blocks to be used by both the access node and the second sub-cell access node is selected (408). For example, based on the distance D2, communication system 100 may select a second allocation of overlapping resource blocks to be used by both access node 110 and sub-cell access node 130. The second allocation of overlapping resource blocks may increase or decrease as the first distance increases.

When the first distance is greater than the second distance, the number of resource blocks in the first allocation may be made such that it is greater than the number of blocks in the second allocation. Communication system 100 may also allocate resource blocks to sub-cell access node 120 such that there is no overlap between resource blocks used by sub-cell access node 120 and access node 110. This allocation may be increased or decreased as the distance between access node 110 and sub-cell access node 120 is changed. In particular, this allocation may be increased as the distance between access node 110 and sub-cell access node 120 is decreased. Likewise, communication system 100 may allocate resource blocks to sub-cell access node 130 such that there is no overlap between resource blocks used by sub-cell access node 130 and access node 110. This allocation may be increased or decreased as the distance between access node 110 and sub-cell access node 130 is changed. In particular, this allocation may be increased as the distance between access node 110 and sub-cell access node 120 is decreased.

Figure 5:
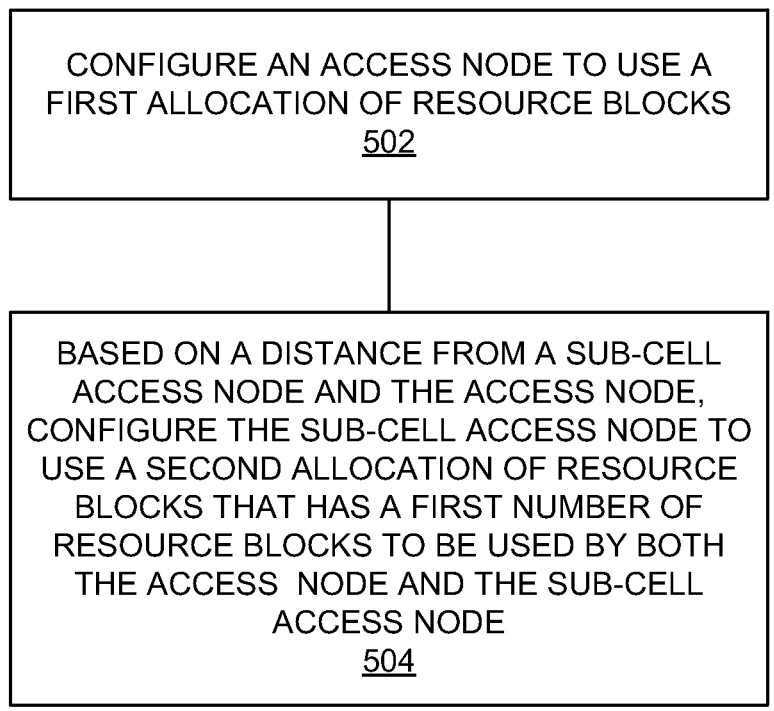
FIG. 5 is a flowchart illustrating a method of configuring a communication system.

FIG. 5 is a flowchart illustrating a method of configuring a communication system. The steps illustrated in FIG. 5 may be performed by one or more elements of communication system 100 and/or communication system 300. An access node is configured to use a first allocation of resource blocks (502). For example, scheduler management node 360 may configure access node 310 (and scheduler 312, in particular) to use resource block allocation 211. Based on a distance from a sub-cell access node and the access node, configure the sub-cell access node to use a second allocation of resource blocks that has a first number of resource blocks to be used by both the access node and the sub-cell access node (504). For example, based on the distance between sub-cell access node 320 and access node 310, scheduler management node 360 may configure sub-cell access node 320 (and scheduler 322, in particular) to use resource block allocation 212. Resource block allocation 212 includes overlapping allocation 213 that are used by both access node 310 and sub-cell access node 320.

Resource block allocation 212 can also include a portion of resource blocks that are only used by sub-cell access node 320 (i.e., the portion of allocation 212 shown in FIG. 2 that is not part of overlapping allocation 213). Scheduler management node 360 may be configured to determine the distance between access node 310 and sub-cell access node 320. Scheduler management node 360 may be configured to communicate allocation 212 to sub-cell access node 320.

Figure 6:
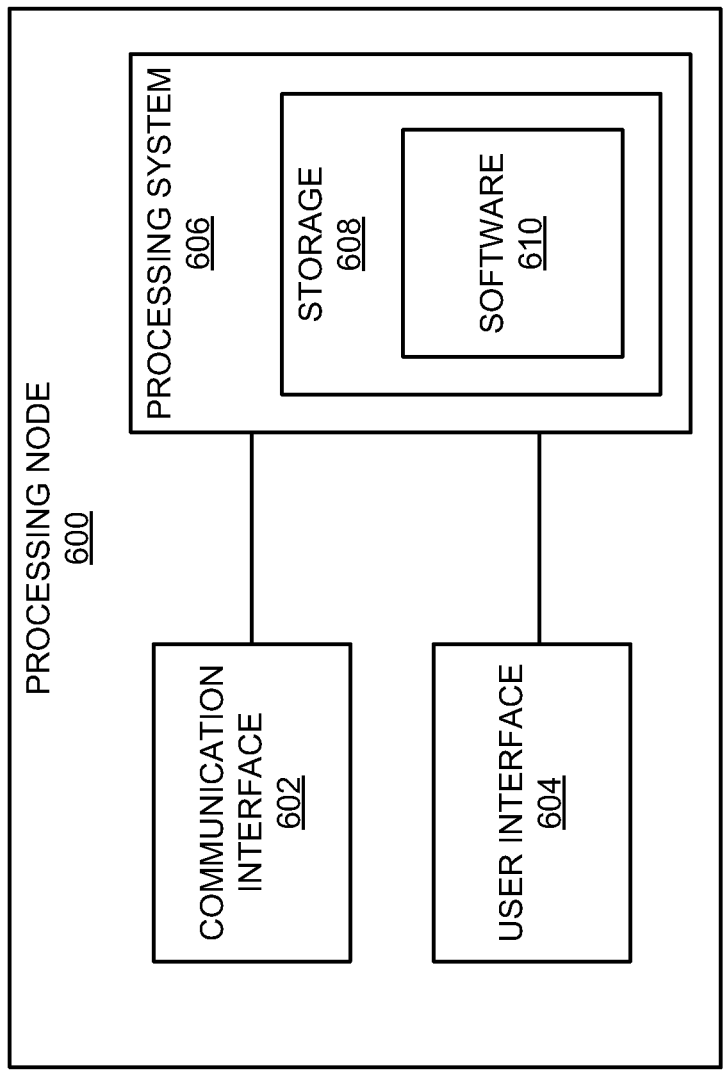
FIG. 6 illustrates a processing node.

FIG. 6 illustrates an exemplary processing node 600 comprising communication interface 602, user interface 604, and processing system 606 in communication with communication interface 602 and user interface 604. Processing node 600 is capable of paging a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An example of processing node 600 includes scheduler management node 360. Processing node 600 can also be an adjunct or component of a network element, such as an element of access node 110, sub-cell access node 120, sub-cell access node 130, access node 310, sub-cell access node 320, sub-cell access node 330, network 350, a mobility management entity, a gateway, a proxy node, an application server, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion.

The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   determining a first indicator of a first distance between an access node and a first sub-cell access node, the first sub-cell access node being located in a coverage area of the access node; and,
   based on the first indicator of the first distance, selecting a first allocation of air-interface resource blocks to be used by both the access node and the first sub-cell access node such that the first allocation of air-interface resource blocks increases as the first distance increases, wherein a second allocation of air-interface resource blocks is selected to be used by the first sub-cell access node and not by the access node, and the second allocation of air-interface resource blocks increases as the first distance decreases.

2. The method of claim 1, further comprising:
   determining a second indicator of a second distance between the access node and a second sub-cell access node, the second sub-cell access node being located in a coverage area of the access node; and,
   based on the second indicator of the second distance, selecting a second third allocation of air-interface resource blocks to be used by both the access node and the second sub-cell access node.

3. The method of claim 2, wherein the third allocation of air-interface resource blocks increases as the second distance increases.

4. The method of claim 2, wherein the first distance is greater than the second distance and a first number of resource blocks in the first allocation is greater than a second number of resource blocks in the third allocation.

5. The method of claim 4, wherein a fourth number of resource blocks is allocated for use by the second sub-cell access node not allocated for use by the access node, the fourth number being greater than the third number when the second distance is less than the first distance.

6. A communication system comprising:
   an access node having an access node scheduler; and,
   a first sub-cell access node that is located in a coverage area of the access node, the first sub-cell access node having a first sub-cell access node coverage area that is contained in the coverage area of the access node, the first sub-cell access node being located a first distance from the access node, the first sub-cell access node having a first sub-cell scheduler, a management node being in communication with the access node scheduler and the first sub-cell scheduler, the management node determining a first allocation of air-interface resource blocks to be used by the access node scheduler and the first sub-cell scheduler based on the first distance such that the first allocation of air-interface resource blocks increases as the first distance increases, wherein the management node determines a second allocation of air-interface resource blocks to be used by the first sub-cell scheduler and not the access node scheduler such that the second allocation of air-interface resource blocks increases as the first distance decreases.

7. The communication system of claim 6, wherein the management node determines the first allocation such that a first number of air-interface resource blocks are used by both the access node and the first sub-cell access node.

8. The communication system of claim 7, further comprising:
   a second sub-cell access node that is located in the coverage area of the access node, the second sub-cell access node having a second sub-cell access node coverage area that is contained in the coverage area of the access node, the second sub-cell access node being located a second distance from the access node, the second sub-cell access node having a second sub-cell scheduler, the management node determining, based on the first distance and the second distance, a third allocation of air-interface resource blocks to be used by the access node scheduler, the first sub-cell scheduler, and the second sub-cell scheduler.

9. The communication system of claim 8, wherein the management node determines the third allocation such that a second number of air-interface resource blocks are used by both the access node and the second sub-cell access node.

10. The communication system of claim 9, wherein the management node determines the third allocation such that the first number of air-interface resource blocks is greater than the second number of air-interface resource blocks when the first distance is greater than the second distance.

11. The communication system of claim 6, further comprising:
    a second sub-cell access node that is located in the coverage area of the access node, the second sub-cell access node having a second sub-cell coverage area that is contained in the coverage area of the access node, the second sub-cell access node being located a second distance from the access node, the second sub-cell access node having a second sub-cell scheduler, the management node determining, based on the first distance and the second distance, a third allocation of air-interface resource blocks to be used by the first sub-cell scheduler and the second sub-cell scheduler and not the access node scheduler.

12. The communication system of claim 11, wherein the third allocation includes a first number of air-interface resource blocks to be used by the first sub-cell access node and a second number of air-interface resource blocks to be used by the second sub-cell access node and the first number is greater than the second number if the first distance is less than the second distance.

13. A method of operating a wireless communication system, comprising:
    configuring an access node to use a first allocation of resource blocks; and,
    configuring a sub-cell access node to use a second allocation of resource blocks, the first allocation and the second allocation having a first number of resource blocks to be used by both the access node and the sub-cell access node, the first number being dependent on a distance from the sub-cell access node to the access node, wherein the second allocation has a second number of resource blocks to be used by the sub-cell access node and not to be used by the access node and the second number increases as the distance decreases.

14. The method of claim 13, further comprising:
  configuring a management node to determine the distance and communicate the first allocation to the access node and to communicate the second allocation to the sub-cell access node.

* * * * *